United States Patent [19]
Taylor

[11] Patent Number: 5,920,989
[45] Date of Patent: Jul. 13, 1999

[54] AUTOMATIC ADJUSTING PIPE CUTTING APPARATUS

[76] Inventor: Scott L. Taylor, 421 W. 100 South, Veyo, Utah 84782

[21] Appl. No.: 09/015,013

[22] Filed: Jan. 28, 1998

Related U.S. Application Data

[60] Provisional application No. 60/036,695, Jan. 31, 1997.
[51] Int. Cl.$^6$ .................................................. B23D 21/04
[52] U.S. Cl. ................................. 30/101; 30/102; 30/500
[58] Field of Search ................................ 30/44, 45, 101, 30/102, 500, 93, 97; 82/46

[56] References Cited

U.S. PATENT DOCUMENTS

| | | | |
|---|---|---|---|
| 2,699,604 | 1/1955 | Ingwer et al. | 30/97 |
| 3,732,618 | 5/1973 | Lorenz | 30/97 |
| 3,807,047 | 4/1974 | Sherer et al. | 30/97 |
| 3,839,791 | 10/1974 | Feamster, III | 30/97 |
| 3,942,248 | 3/1976 | Sherer et al. | 30/97 |
| 4,624,052 | 11/1986 | Garcia et al. | 30/97 |
| 4,769,911 | 9/1988 | Araki | 30/94 |
| 4,939,964 | 7/1990 | Ricci | 82/113 |
| 5,243,760 | 9/1993 | May, Jr. | 30/101 |
| 5,528,830 | 6/1996 | Hansen | 30/97 |

FOREIGN PATENT DOCUMENTS

| | | | |
|---|---|---|---|
| 2682902 | 4/1993 | France | 30/95 |

Primary Examiner—Douglas D. Watts
Attorney, Agent, or Firm—Flanagan & Flanagan; John K. Flanagan; John R. Flanagan

[57] ABSTRACT

An automatic adjusting pipe cutting apparatus includes a housing having a first compartment defining a first cavity and a first axis of rotation extending in orthogonal relationship thereto and a second compartment defining a second cavity and a second axis of rotation extending in orthogonal relationship thereto, a cutting mechanism for cutting a pipe disposed in the first cavity, and a driving mechanism for driving the cutting mechanism disposed in the second cavity. The housing has a hinge disposed between and connecting the first and second compartments which allows them to pivot in relation to one another. The housing also has rollers circumferentially spaced apart from one another and rotatably mounted to the first compartment about the first cavity. The cutting mechanism has a cylindrical frame supported within the first cavity by the rollers and thereby is rotatable about the first axis of rotation. The driving mechanism has a drive wheel disposed in the second cavity and mounted to the second compartment and is rotatable about the second axis of rotation, a drive shank attached to and extending axially from the drive wheel and extending coaxially with the second axis of rotation for driving engagement with an external tool so as to cause rotation of the drive wheel upon rotation of the drive shank, and a resilient continuous belt mounted about and encircling the drive wheel and frictionally engaging the cylindrical frame so as to cause rotation of the cylindrical frame upon rotation of the drive wheel, causing the cutting mechanism to cut through the pipe.

18 Claims, 3 Drawing Sheets

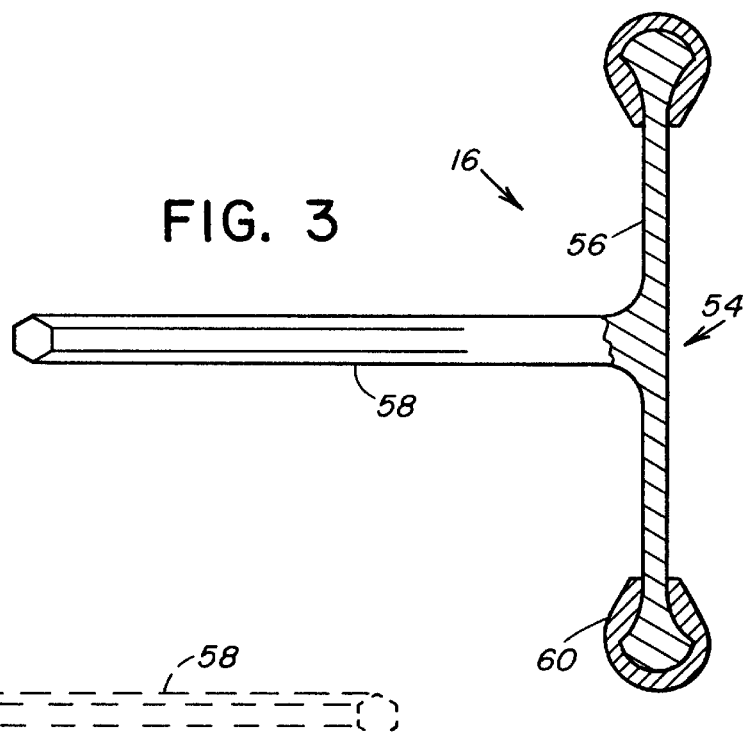
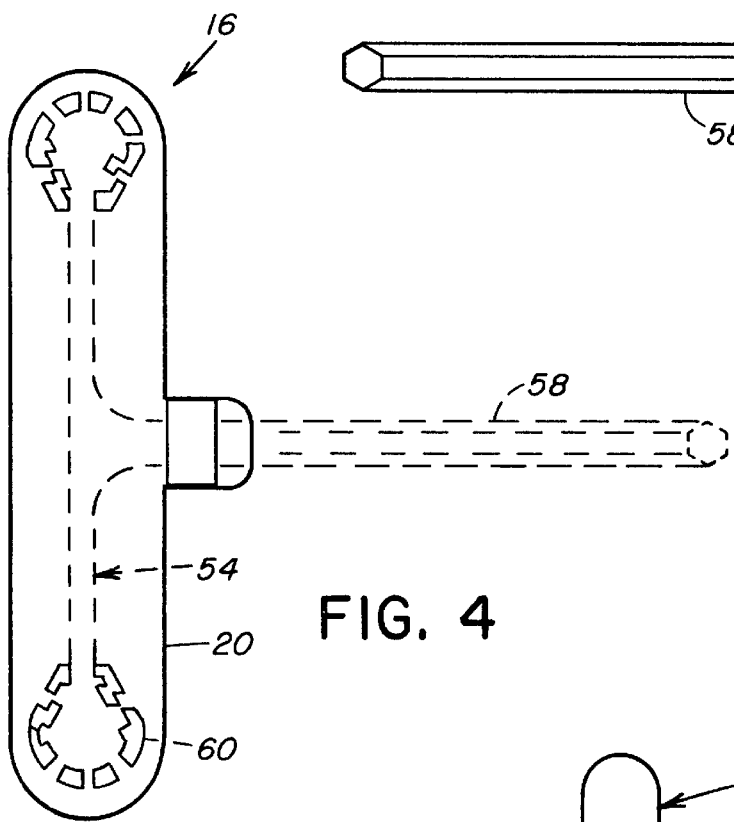
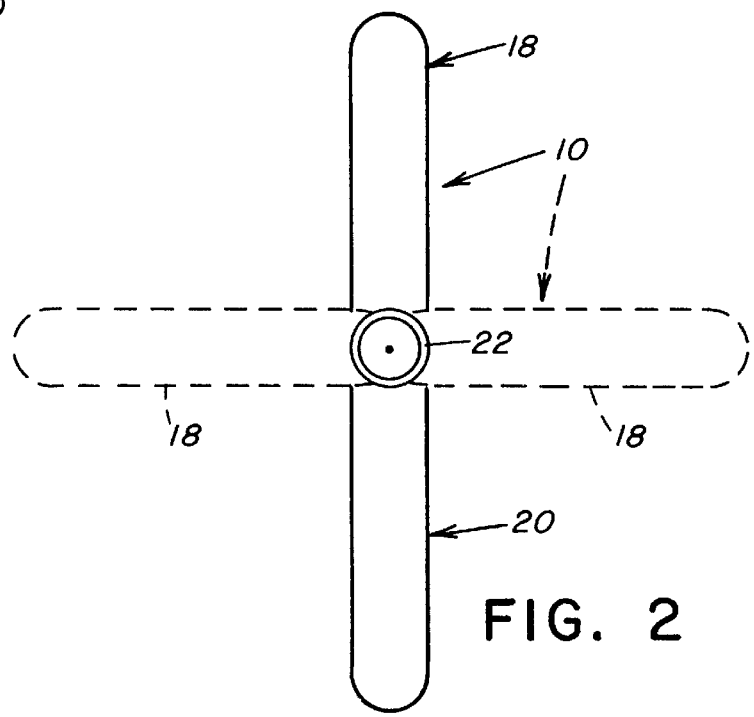

AUTOMATIC ADJUSTING PIPE CUTTING APPARATUS

This application claims the benefit of U.S. provisional application No. 60/036,695, filed Jan. 31, 1997.

BACKGROUND OF THE INVENTION

1. Field of the Invention

The present invention generally relates to devices for cutting pipes and, more particularly, is concerned with an automatic adjusting pipe cutting apparatus.

2. Description of the Prior Art

In the process of cutting a pipe, a user must fit a piper cutter around the pipe, adjust a cutting die at an initial setting relative to the pipe and turn the cutter around the pipe several times making an initial cut into the pipe. After a cut depth corresponding to the initial die setting is reached, a user must readjust the cutting die toward the pipe and then turn the cutter around the pipe several more times in order to continue cutting the pipe. These steps are repeated until the pipe is cut off. If several pipes need to be cut, which is often the case in the work of a plumber, the cutting die must be adjusted back to its initial setting and the steps must be repeated over and over to cut off all of the pipes.

A problem exists, however, in the use of a typical prior art piper cutter in that the operative steps are tedious and tiresome and require an inordinate amount of time to accomplish.

Consequently, a need remains for a device for cutting pipes which is more efficient than prior art devices.

SUMMARY OF THE INVENTION

The present invention provides an automatic adjusting pipe cutting apparatus which is designed to satisfy the aforementioned need. The automatic adjusting pipe cutting apparatus is simple to use, requires relatively less time to operate in comparison to other devices and is adaptable for use with pipes of a variety of sizes and in different situations. The apparatus utilizes frictional engagement as a means for driving its means for cutting pipes. The use of friction permits employment of less complex components as parts of the driving means and cutting means. A hinge on a housing between separate compartments for the driving means and cutting means allows for pivotal movement of the driving means and cutting means in relation to one another and thereby provides the apparatus with more versatility.

Accordingly, the present invention is directed to an automatic adjusting pipe cutting apparatus which comprises: (a) a housing including (i) a first compartment defining a first cavity and a first axis of rotation extending in substantially orthogonal relationship to the first cavity, (ii) a second compartment defining a second cavity and a second axis of rotation extending in substantially orthogonal relationship to the second cavity, the second compartment being disposed in side by side tandem relation to the first compartment, the first and second axes of rotation of the first and second compartments being spaced apart from one another, and (iii) a hinge disposed between and connecting the first and second compartments for pivotal movement relative to one another between first and second angularly displaced positions; (b) means for cutting a pipe disposed in the first cavity of the first compartment of the housing; and (c) means for driving the cutting means disposed in the second cavity of the second compartment of the housing. In the first position, the first and second compartments substantially lie in a common plane and the first and second axes of rotation of the first and second compartments substantially extend in parallel relation to one another. In the second position, the first and second compartments substantially lie in orthogonal relation to one another and the first and second axes of rotation of the first and second compartments substantially extend in orthogonal relation to one another.

More particularly, the first compartment of the housing has a circumferential portion and a remainder portion. The circumferential portion at a first end is hinged to the remainder portion and at a second end is releasably latched to the remainder portion such that the circumferential portion is pivotal between open and closed positions relative to the remainder portion and such that the circumferential portion in the open position permits lateral placement of the pipe within the first cavity of the first compartment whereas in the closed position, in combination with the remainder portion, the first compartment encircles the pipe.

The housing further includes a plurality of rollers each being circumferentially spaced apart from one another and rotatably mounted to the first compartment of the housing about the first cavity of the first compartment. The cutting means includes a cylindrical frame having a pair of sections pivotally connected to one another at respective adjacent first ends and releasably latched to one another at respective adjacent second ends such that the sections are pivotal between open and closed positions and such that the sections in the open position permit lateral placement of the pipe within the first cavity of the first compartment of the housing and in the closed position encircle the pipe. The cylindrical frame is supported within the first cavity of the first compartment of the housing by the plurality of rollers of the housing and thereby is rotatable about the first axis of rotation of the first compartment.

The driving means includes a drive wheel, a drive shank and a resilient continuous belt. The drive wheel is disposed in the second cavity of and mounted to the second compartment of the housing and is rotatable about the second axis of rotation of the second compartment of the housing. The drive shank is attached to and extends axially from the drive wheel and extends coaxially with the second axis of rotation for driving engagement with an external tool so as to cause rotation of the drive wheel upon rotation of the drive shank. The resilient continuous belt is mounted about and encircles the drive wheel. The belt frictionally engages the cylindrical frame of the cutting means so as to cause rotation of the cylindrical frame of the cutting means upon rotation of the belt with rotation of the drive wheel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of an automatic adjusting pipe cutting apparatus of the present invention.

FIG. 2 is a side elevational view of first and second compartments of a housing of the automatic adjusting pipe cutting apparatus showing axes of rotation of the first and second compartments in substantially parallel relation to one another in solid line form and in substantially orthogonal relation to one another in dashed line form.

FIG. 3 is a side elevational view of the driving means of the apparatus.

FIG. 4 is a side elevational view of the driving means of the apparatus disposed in the second compartment of the housing of the apparatus.

DETAILED DESCRIPTION OF THE INVENTION

Figure 1:
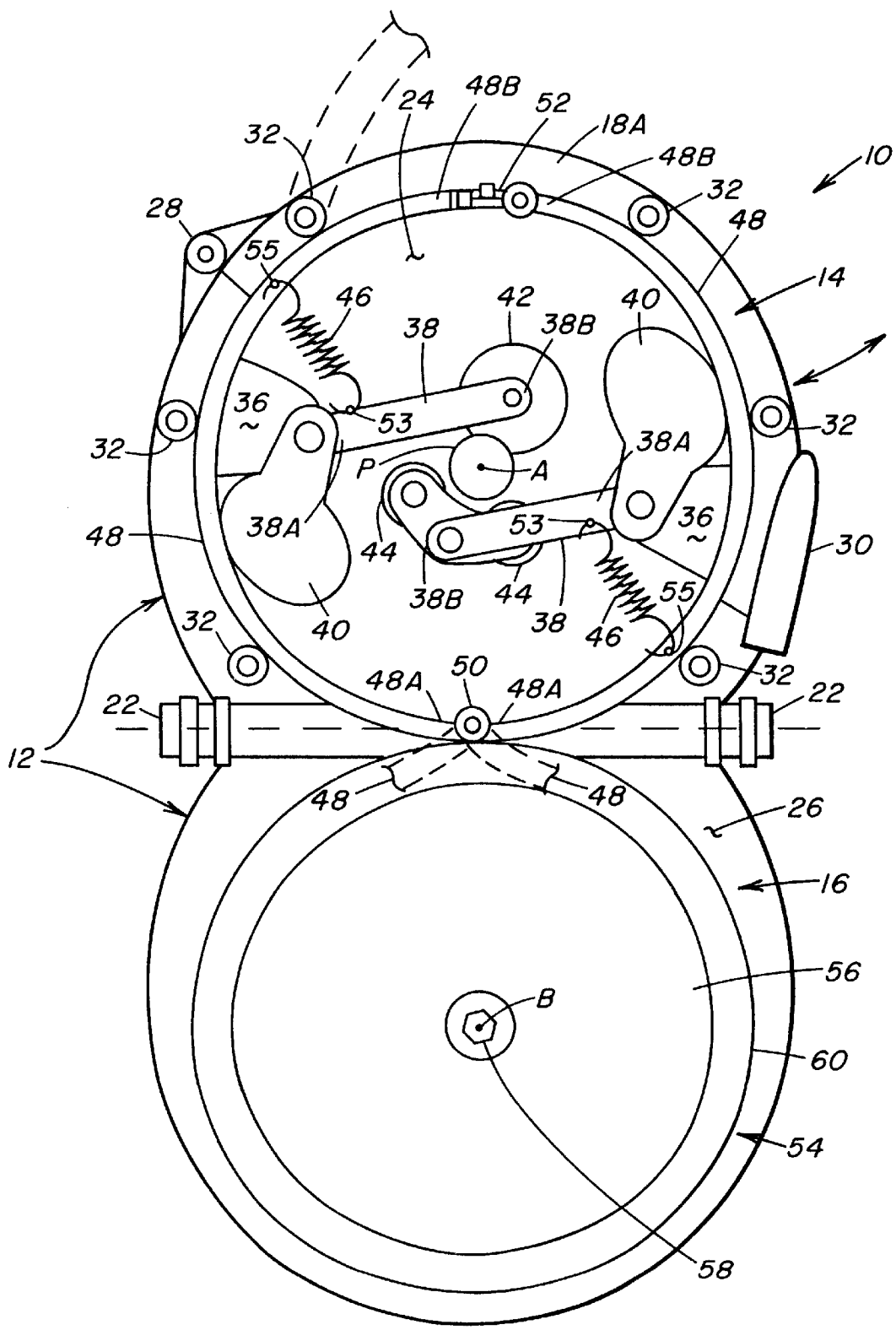

Referring to the drawings and particularly to FIGS. 1 and 2, there is illustrated an automatic adjusting pipe cutting apparatus, generally designated 10, of the present invention. Basically, the automatic adjusting pipe cutting apparatus 10 includes a housing 12, a pipe cutting mechanism 14 and a driving mechanism 16.

Referring to FIG. 1, the housing 12 of the apparatus 10 has first and second compartments 18, 20 disposed in side-by-side tandem relationship, and a hinge 22 disposed between and pivotally connecting the first and second compartments 18, 20. The first and second compartments 18, 20 respectively define first and second cavities 24, 26 with respective axes of rotation A, B extending in substantially orthogonal relationships to the first and second cavities 24, 26. The first and second axes A, B are spaced apart from one another.

The hinge 22 of the housing 12 allows the first and second compartments 18, 20 of the housing 12 to pivot in relation to one another between a first position and a second position. In the first position, as shown in solid line form in FIG. 2, the first and second compartments 18, 20 substantially lie in a common plane and the first and second axes A, B of rotation of the first and second compartments 18, 20 substantially extend in parallel relation to one another. In the second position, as shown in dashed line form in FIG. 2, the first and second compartments 18, 20 substantially lie in orthogonal relation to one another and the first and second axes A, B of rotation of the first and second compartments 18, 20 substantially extend in orthogonal relation to one another.

More particularly, the first compartment 18 of the housing 12 has a circumferential portion 27, a remainder portion 29, a pivot element 28 and a latch 30. The pivot element 28 is disposed at a first end 27A of the circumferential portion 27 so that the circumferential portion 27 is thereby pivotally connected to the remainder portion 29. The latch 30 is disposed at a second end 27B of the circumferential portion 27 so that the circumferential portion 27 is thereby releasably latched to the remainder portion 29. The pivotal element 28 allows the circumferential portion 27 to pivot between open and closed positions relative to the remainder portion 29. In the open position as partially seen in dashed line form in FIG. 1, the circumferential portion 27 permits lateral placement of the pipe P within the first cavity 16 of the first compartment 14. In the closed position as seen in full line form in FIG. 1, in combination with the remainder portion 29, the first compartment 18 encircles the pipe P.

The housing 12 further has a plurality of rollers 32 each being circumferentially spaced apart from one another and rotatably mounted to the first compartment 18 of the housing 12 about the first cavity 24 of the first compartment 18 of the housing 12. The rollers 32 are attached to the circumferential portion 27 and remainder portion 29 of the first compartment 18. Half of the rollers 32 are on the circumferential portion 27 while the other half of the rollers 32 are on the remainder portion 29. The rollers 32 may number six, as shown in FIG. 1, or may be of any other suitable number.

Figure 5:
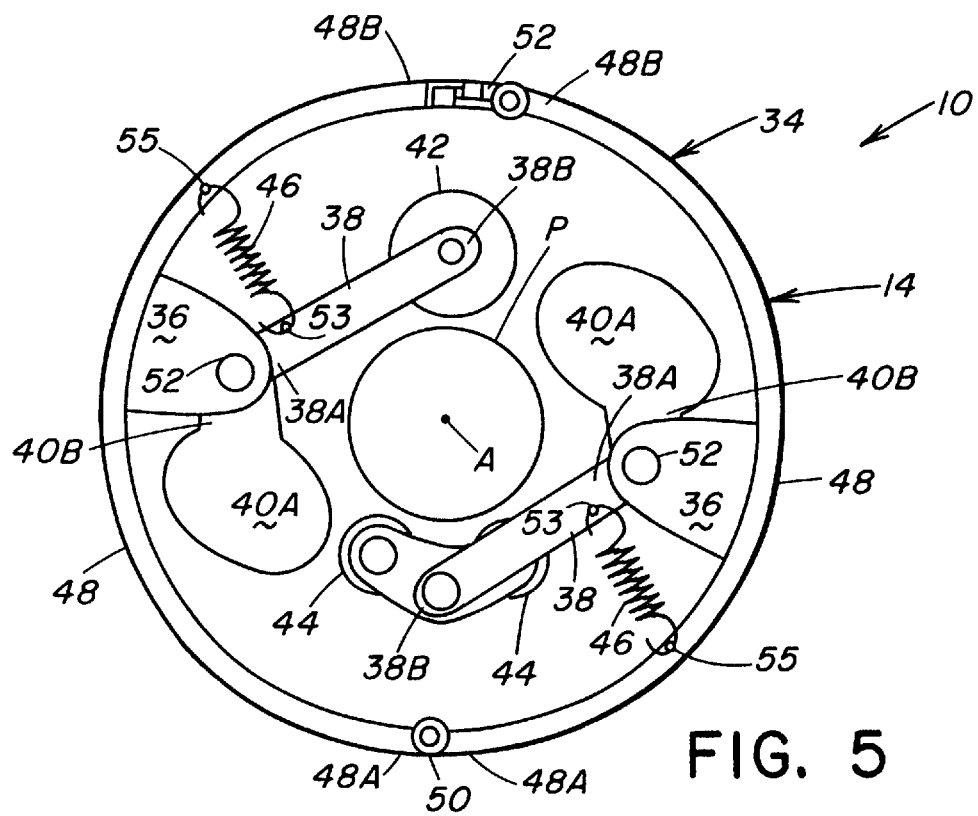
FIG. 5 is a side elevational view of the cutting means of the apparatus disengaged from a pipe extending therethrough.
Figure 6:
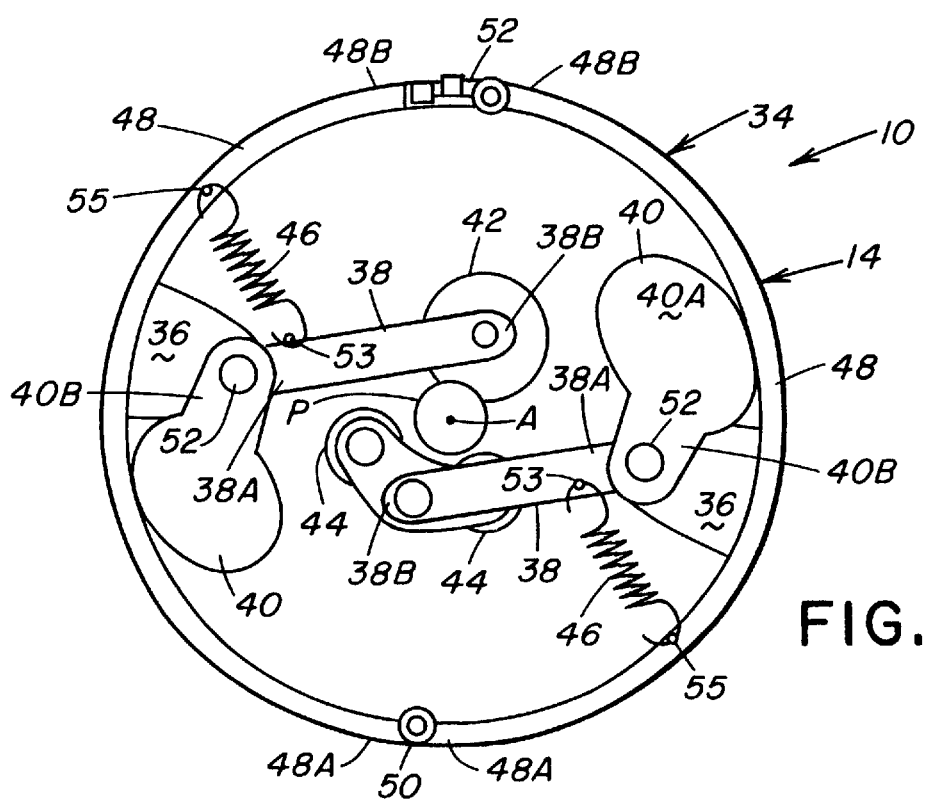
FIG. 6 is a side elevational view of the cutting means of the apparatus engaged with the pipe extending therethrough.

Referring now to FIGS. 1, 5 and 6, the cutting mechanism 14 of the apparatus 10 includes a cylindrical frame 34, a pair of lugs 36, a pair of first and second arms 38, a pair of counterweights 40, a cutter wheel 42, a pair of guide wheels 44 and a pair of coil springs 46. The cylindrical frame 34 has a pair of semi-cylindrical tubular sections 48, a hinge element 50 and a latch element 52. The hinge element 50 is attached at adjacent first ends 48A of the tubular sections 48 so that the tubular sections 48 are pivotally connected to one another at their first ends 48A. The latch element 52 is attached at adjacent second ends 48B of the tubular sections 48 so that the tubular sections 48 are releasably latched to one another at their second ends 48B. The hinge element 50 allows the tubular sections 48 to pivot between open and closed positions. In the open position as partially shown in dashed line form in FIG. 1, the tubular sections 48 permit lateral placement of the pipe P within the first cavity 24 of the first compartment 18 of the housing 12. In the closed position as shown in full line form in FIG. 1, the tubular sections 48 encircle the pipe P. The cylindrical frame 34 is rotatably supported within the first cavity 24 of the first compartment 18 of the housing 12 by the plurality of rollers 32 of the housing 12 and thereby is rotatable about the first axis of rotation A of the first compartment 18 of the housing 12.

One of the lugs 36 is fixedly attached to one of the tubular sections 48 of the cylindrical frame 34 and is disposed diametrically opposite the other of the lugs 36. Each lug 36 is in the form of a block, but may have any other suitable shape. The first and second arms 38 each has first and second opposite ends 38A, 38B and are pivotally coupled at the first or outer opposite end 38A to one of the lugs 36. Each arm 38 has a pin 54 integral therewith and disposed at a point adjacent to but spaced from the point of coupling to the one lug 36. The counterweights 40 are each respectively connected to the first opposite end 38A of one of the first and second arms 38 and are movable therewith and disposed on an opposite side of the pivot point on the respective one lug 36 from the respective one arm 38. Each counterweight 40 has a substantially round head 40A and a relatively smaller neck 40B, but may have any other suitable shape. The cutter wheel 42 is rotatably mounted to the second or inner opposite end 38B of the first arm 38. The cutter wheel 42 may be of any conventional type. The pair of guide wheels 44 are rotatably mounted to the second opposite end 38B of the second arm 38. The guide wheels 44 may be of any conventional type. The pair of coil springs 46 are each connected to and extend between one of the tubular sections 48 of the cylindrical frame 34 and one of the pair of first and second arms 38 so as to exert a biasing force on the respective one arm 38 to cause the respective one arm 38 to pivot toward the respective one tubular section 48. Each coil spring 46 is yieldable so as to permit the respective one arm 38 to move away from the respective one tubular section 48, whereby in response to rotation of the cylindrical frame 34 the pair of counterweights 40 under the influence of centrifugal force pivot inwardly away from the tubular sections 48 and move the cutter wheel 42 and the pair of guide wheels 44 toward and into contact with the pipe P to make a cut around the pipe P extending along the first axis of rotation A of the first compartment 18 of the housing 12. The pipe P, being surrounded by the cylindrical frame 34 in operative position for being cut, is disposed between the cutter wheel 42 and guide wheels 44. On the other hand, in response to termination of rotation of the cylindrical frame 34, the arms 38 under the influence of the biasing force of the coil springs 46 pivot outwardly toward the tubular sections 38 and away from the pipe P, forcing the counterweights 40 to pivot inwardly away from the tubular sections 48. Each coil spring 46 has a hook portion 46A at each end thereof. The hook portion 46A is engaged with the pin 54 on the adjacent arm 38 and with another pin 55 on one of the tubular sections 48.

Referring now to FIGS. 1 and 3 to 5, the driving mechanism 16 includes a drive wheel 54 having a circular core 56, a drive shank 58 and a resilient continuous belt 60. The drive wheel 54 is disposed in the second cavity 26 of the second compartment 20 of the housing and is mounted to the second compartment 20 so as to be rotatable about the second axis of rotation B thereof. The drive wheel 54 may be of any conventional type. The drive shank 58 is attached to and extends axially from the drive wheel 54 and extends coaxially with the second axis of rotation B for driving engagement with an external tool (not shown) so as to cause rotation of the drive wheel 54 upon rotation of the drive shank 58. The drive shank 58 may be of any conventional type. The resilient continuous belt 60 is mounted about and encircles the drive wheel 54. The belt 60 frictionally engages the cylindrical frame 34 of the cutting mechanism 14, as shown in FIG. 1, so as to cause rotation of the cylindrical frame 34 of the cutting mechanis, 14 upon rotation of the belt 60 with the rotation of the drive wheel 54. The belt 60 may be of any conventional type.

By this arrangement, the apparatus 10 makes pipe cutting for plumbers, electricians, air-conditioning workers or any household do-it-yourselfer much faster, simpler and easier. The apparatus 10 will cut various conduit, pvc, abs and tubing materials of various diameters. To use the apparatus 10, it is slipped over the pipe P or tubing to be cut. Then, the trigger of a suitable drive tool, such as a power drill, is pulled, causing rotation of the drive shank 58 of the driving mechanism 16 and thereby rotation of the cylindrical frame 34 of the cutting mechanism 14 via the drive wheel 54 of the driving mechanism 16. Due to the influence of centrifugal force on the counterweights 40 of the cutting mechanism 14, the latter will automatically adjust to the size of the pipe P and cut it in a time of a few seconds. If the pipe P is too long or is already connected in line, the user can simply unlatch the circumferential portion 27 of the first compartment 18 of the housing 12 and slip it over the pipe p, then relatch it and the apparatus 10 is then ready to go. The self-adjusting aspect of the apparatus 10 is created by the presence of the coil springs 46 of the cutting mechanism 14 which hold the arms 38 of the cutting mechanism 14 and thus the cutter wheel 42 and guide wheels 44 of the cutting mechanism 14 to their most open position until the cutting mechanism 14 is spun by rotation of the drive wheel 54 of the driving mechanism 16. The spinning caused by the drive wheel 54 of the driving mechanism 16 will rotate the cutter wheel 42 of the cutting mechanism 14 around the pipe P very fast until it cuts all the way through.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An automatic adjusting pipe cutting apparatus, comprising:
   (a) a housing including
      (i) a first compartment defining a first cavity and a first axis extending in substantially orthogonal relationship to said first cavity,
      (ii) a second compartment defining a second cavity and a second axis extending in substantially orthogonal relationship to said second cavity, said second compartment being disposed in side by side tandem relation to said first compartment, said first and second axes of said first and second compartments being spaced apart from one another, and
      (iii) a hinge disposed between and connecting said first and second compartments for pivotal movement of said first and second compartments relative to one another between first and second angularly displaced positions;
   (b) means for cutting a pipe disposed in said first cavity of said first compartment of said housing and rotatable about said first axis; and
   (c) means for driving said cutting means disposed in said second cavity of said second compartment of said housing and rotatable about said second axis.

2. The apparatus of claim 1 wherein said first and second compartments in said first position substantially lie in a common plane and said first and second axes of said first and second compartments substantially extend in parallel relation to one another.

3. The apparatus of claim 1 wherein said first and second compartments in said second position substantially lie in orthogonal relation to one another and said first and second axes of said first and second compartments substantially extend in orthogonal relation to one another.

4. The apparatus of claim 3 wherein said first and second compartments in said first position substantially lie in a common plane and said first and second axes of said first and second compartments substantially extend in parallel relation to one another.

5. The apparatus of claim 1 wherein said first compartment of said housing has a circumferential portion and a remainder portion, said circumferential portion at a first end being hinged to said remainder portion and at a second end being releasably latched to said remainder portion such that said circumferential portion is pivotal between open and closed positions relative to said remainder portion and such that said circumferential portion in said open position permits lateral placement of the pipe within said first cavity of said first compartment whereas in said closed position, in combination with said remainder portion, said first compartment encircles the pipe.

6. The apparatus of claim 1 wherein said housing further includes a plurality of rollers each being circumferentially spaced apart from one another and rotatably mounted to said first compartment of said housing about said first cavity of said first compartment.

7. The apparatus of claim 6 wherein said cutting means includes a cylindrical frame having a pair of sections pivotally connected to one another at respective adjacent first ends and releasably latched to one another at respective adjacent second ends such that said sections are pivotal between open and closed positions and such that said sections in said open position permit lateral placement of the pipe within said first cavity of said first compartment of said housing whereas in said closed position said sections encircle the pipe, said cylindrical frame being supported within said first cavity of said first compartment of said housing by said plurality of rollers of said housing such that said cylindrical frame is rotatable about said first axis of said first compartment.

8. The apparatus of claim 7 wherein said cutting means further includes:

a pair of lugs each fixedly attached to one of said sections of said cylindrical frame and disposed diametrically opposite the other of said pair of lugs;

a pair of first and second arms each having first and second opposite ends and pivotally coupled at said first opposite end to one of said pair of lugs;

a pair of counterweights each connected to said first opposite end of one of said pair of first and second arms and being movable therewith and disposed on an opposite side of the pivot point on the respective said one lug from the respective said one arm;

a cutter wheel rotatably mounted to said second opposite end of said first arm;

a pair of guide wheels rotatably mounted to said second opposite end of said second arm; and a pair of coil springs each connected to and extending between one of said sections of said cylindrical frame and one of said pair of first and second arms so as to exert a biasing force on the respective said one arm to cause the respective said one arm to pivot toward the respective said one section and each being yieldable so as to permit the respective said one arm to move away from the respective said one section, whereby in response to rotation of said cylindrical frame said pair of counterweights under the influence of centrifugal force pivot inwardly away from said sections and move said cutter wheel and said pair of guide wheels toward and into contact with the pipe to make a cut around the pipe extending along said first axis of said first compartment of said housing.

9. The apparatus of claim 7 wherein said driving means includes:

a drive wheel disposed in said second cavity of and mounted to said second compartment of said housing and being rotatable about said second axis of said second compartment of said housing; and a resilient belt mounted about and encircling said drive wheel and frictionally engaging said cylindrical frame of said cutting means so as to cause rotation of said cylindrical frame of said cutting means upon rotation of said belt with rotation of said drive wheel.

10. The apparatus of claim 9 wherein said driving means further includes a drive shank attached to and extending axially from said drive wheel and extending coaxially with said second axis for driving engagement with an external tool so as to cause rotation of said drive wheel upon rotation of said drive shank.

11. An automatic adjusting pipe cutting apparatus, comprising:

(a) a housing including
 (i) a first compartment defining a first cavity and a first axis extending in substantially orthogonal relationship to said first cavity,
 (ii) a second compartment defining a second cavity and a second axis extending in substantially orthogonal relationship to said second cavity, said second compartment being disposed in side by side tandem relation to said first compartment, said first and second axes of said first and second compartments being spaced apart from one another, and
 (iii) a plurality of rollers each being circumferentially spaced apart from one another and rotatably mounted to said first compartment of said housing about said first cavity of said first compartment;

(b) means for cutting a pipe disposed in said first cavity of said first compartment of said housing, said cutting means including a cylindrical frame being supported within said first cavity of said first compartment of said housing by said plurality of rollers of said housing such that said cylindrical frame is rotatable about said first axis of said first compartment of said housing; and (c) means for driving said cutting means disposed in said second cavity of said second compartment of said housing, said driving means including
 (i) a drive wheel disposed in said second cavity of and mounted to said second compartment of said housing and being rotatable about said second axis of said second compartment of said housing,
 (ii) a drive shank attached to and extending axially from said drive wheel and extending coaxially with said second axis for driving engagement with an external tool so as to cause rotation of said drive wheel upon rotation of said drive shank, and
 (iii) a resilient belt mounted about and encircling said drive wheel and frictionally engaging said cylindrical frame of said cutting means so as to cause rotation of said cylindrical frame of said cutting means upon rotation of said belt with rotation of said drive wheel.

12. The apparatus of claim 11 wherein said first compartment of said housing has a circumferential portion and a remainder portion, said circumferential portion at a first end being hinged to said remainder portion and at a second end being releasably latched to said remainder portion such that said circumferential portion is pivotal between open and closed positions relative to said remainder portion and such that said circumferential portion in said open position permits lateral placement of the pipe within said first cavity of said first compartment whereas in said closed position, in combination with said remainder portion, said first compartment encircles the pipe.

13. The apparatus of claim 11 wherein said cylindrical frame of said cutting means has a pair of semi-cylindrical sections pivotally connected to one another at respective adjacent first ends and releasably latched to one another at respective adjacent second ends such that said sections are pivotal between open and closed positions and such that said sections in said open position permit lateral placement of the pipe within said first cavity of said first compartment of said housing and in said closed position encircle the pipe.

14. The apparatus of claim 13 wherein said cutting means further includes:

a pair of lugs each fixedly attached to one of said sections of said cylindrical frame and disposed diametrically opposite the other of said pair of lugs;

a pair of first and second arms each having first and second opposite ends and pivotally coupled at said first opposite end to one of said pair of lugs;

a pair of counterweights each connected to said first opposite end of one of said pair of first and second arms and being movable therewith and disposed on an opposite side of the pivot point on the respective said one lug from the respective said one arm;

a cutter wheel rotatably mounted to said second opposite end of said first arm;

a pair of guide wheels rotatably mounted to said second opposite end of said second arm; and a pair of coil springs each connected to and extending between one of said sections of said cylindrical frame and one of said pair of first and second arms so as to exert a biasing force on the respective said one arm to cause the respective said one arm to pivot toward the respective said one section and each being yieldable so as to permit the respective said one arm to move away from the respective said one section, whereby in response to rotation of said cylindrical frame said pair of counterweights under the influence of centrifugal force pivot inwardly away from said sections and move said cutter wheel and said pair of guide wheels toward and into contact with the pipe to make a cut around the pipe extending along said first axis of said first compartment of said housing.

15. The apparatus of claim 11 wherein said housing further includes a hinge disposed between and connecting said first and second compartments for pivotal movement relative to one another between first and second angularly-displaced positions.

16. The apparatus of claim 15 wherein said first and second compartments in said first position substantially lie in a common plane and said first and second axes of said first and second compartments substantially extend in parallel relation to one another.

17. The apparatus of claim 15 wherein said first and second compartments in said second position substantially lie in orthogonal relation to one another and said first and second axes of said first and second compartments substantially extend in orthogonal relation to one another.

18. The apparatus of claim 17 wherein said first and second compartments in said first position substantially lie in a common plane and said first and second axes of said first and second compartments substantially extend in parallel relation to one another.

* * * * *